United States Patent
Ebenstein et al.

(10) Patent No.: US 7,068,302 B2
(45) Date of Patent: Jun. 27, 2006

(54) METHOD FOR CAMERA CALIBRATION AND QUALITY TESTING

(75) Inventors: Samuel Edward Ebenstein, Southfield, MI (US); James Stewart Rankin, II, Novi, MI (US); Gregory H. Smith, Ann Arbor, MI (US); Yelena Mordechai Rodin, Southfield, MI (US); David Bednarz, Pontiac, MI (US); Thomas Meitzler, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

(21) Appl. No.: 10/064,769

(22) Filed: Aug. 15, 2002

(65) Prior Publication Data

US 2004/0032496 A1   Feb. 19, 2004

(51) Int. Cl.
*H04N 17/00* (2006.01)
(52) U.S. Cl. .................................. 348/187; 348/188
(58) Field of Classification Search ............... 348/187, 348/188, 25, 28, 216.1, 370; 702/66, 67, 702/81
See application file for complete search history.

(56) References Cited

U.S. PATENT DOCUMENTS

| | | | |
|---|---|---|---|
| 3,776,638 A | 12/1973 | Teter | |
| 4,110,046 A | 8/1978 | Baker et al. | |
| 4,299,451 A * | 11/1981 | Task et al. | 359/501 |
| 4,643,578 A | 2/1987 | Stern | |
| 4,979,135 A | 12/1990 | Moy | |
| 4,991,007 A * | 2/1991 | Corley | 348/188 |
| 5,033,015 A * | 7/1991 | Zwirn | 702/116 |
| 5,267,038 A * | 11/1993 | Fister | 348/191 |
| 5,285,286 A * | 2/1994 | Kannegundla | 348/187 |
| 5,351,201 A * | 9/1994 | Harshbarger et al. | 348/187 |
| 5,748,230 A * | 5/1998 | Orlando et al. | 348/187 |
| 6,061,102 A * | 5/2000 | Sheppard et al. | 348/745 |

* cited by examiner

*Primary Examiner*—Victor R. Kostak
(74) *Attorney, Agent, or Firm*—Frank A. MacKenzie

(57) ABSTRACT

A method for testing cameras includes positioning a camera such that an image of a target is displayed on a monitor within at least one default image parameter. The method further includes engaging a dimming condition of a light source from the camera, thereby generating a lighting condition signal. Subsequently the camera receives the lighting condition signal and displays it on the monitor. A group of observers then analyze the lighting condition signal. The method continues through engaging a second dimming condition of the light source from the first camera, thereby generating a second lighting condition signal, which is also displayed on the monitor. The group of observers then analyzes the second lighting condition signal.

12 Claims, 4 Drawing Sheets

METHOD FOR CAMERA CALIBRATION AND QUALITY TESTING

BACKGROUND OF INVENTION

The present invention relates generally to cameras and more particularly to a method for testing cameras for automotive applications.

Automotive systems have substantially increased the use of cameras in recent history. Applications such as blind spot warnings, pedestrian recognition, adaptive cruise control and driver recognition all require cameras that operate under various lighting conditions. Automotive cameras should provide sufficient contrast resolution under the aforementioned conditions.

Difficulties with current camera applications often occur when a portion of a scene is brightly lit while another portion of the scene is shadowed. Two examples of this are when the sun is in the field of view or at night when headlights of other vehicles are within the field of view. Currently, there are no effective methods of testing camera quality for the aforementioned examples. There are however methods of detection experiment methodology used for evaluating contrasting conditions of an object, such vehicle camouflage.

Manufacturer specifications typically contain information such as lowest operable light level and resolution. However this information is usually insufficient for characterizing cameras for automotive applications. Most low light cameras perform well when an entire scene is dark but provide almost no contrast when there is a bright object in the scene. This lack of contrast tends to make many cameras unsuitable for automotive use.

The disadvantages associated with current methods of qualifying cameras for automotive systems have made it apparent that a new camera applicability testing method for automotive systems is needed. This new method should determine which cameras are most appropriate for automotive systems under high glare conditions.

SUMMARY OF INVENTION

Cameras applied to automotive systems should ideally provide contrast resolution under varied lighting conditions. The present invention substantially simulates a view of oncoming night traffic and gives a quantitative measure of the resolving ability of the camera as the lighting is varied.

The present invention incorporates detection experiment methodology used for evaluating vehicle camouflage and gives a quantitative measure of the resolving ability of a camera as lighting is varied.

In accordance with one aspect of the present invention, a method for testing cameras comprising: positioning a first camera such that an image of a first target is displayed on a monitor substantially within at least one default image parameter; engaging a first dimming condition of a first light source from said first camera, thereby generating a first lighting condition signal; receiving said first lighting condition signal in said first camera; displaying said first lighting condition signal on said monitor; analyzing said first lighting condition signal; engaging a second dimming condition of said first light source from said first camera, thereby generating a second lighting condition signal; displaying said second lighting condition signal on said monitor; and analyzing said second lighting condition signal.

In accordance with another aspect of the present invention, a camera testing system including a first target is disclosed. A first light source is adapted to generate a first light signal. A first camera is aligned a remote distance from the first target and is adapted to receive the first light signal. A first dimming component is adapted to engage a first dimming operation to dim the first light signal, thereby generating a first lighting condition signal. The first dimming component is further adapted to engage a second dimming operation to dim the first light signal thereby generating a second lighting condition signal. A monitor is adapted to receive the first lighting condition signal and the second lighting condition signal and consecutively display the lighting condition signals substantially within at least one default image parameter.

Additional objects and features of the present invention will become apparent upon review of the drawings and accompanying detailed description of the preferred embodiments.

BRIEF DESCRIPTION OF DRAWINGS

For a more complete understanding of the invention, there will now be described some embodiments thereof, given by way of example, reference being made to the accompanying drawings, in which.

DETAILED DESCRIPTION

The present invention is illustrated with respect to a camera testing system, particularly suited to the automotive field. However, the present invention is applicable to various other uses that may require cameras as will be understood by one skilled in the art.

Figure 1:
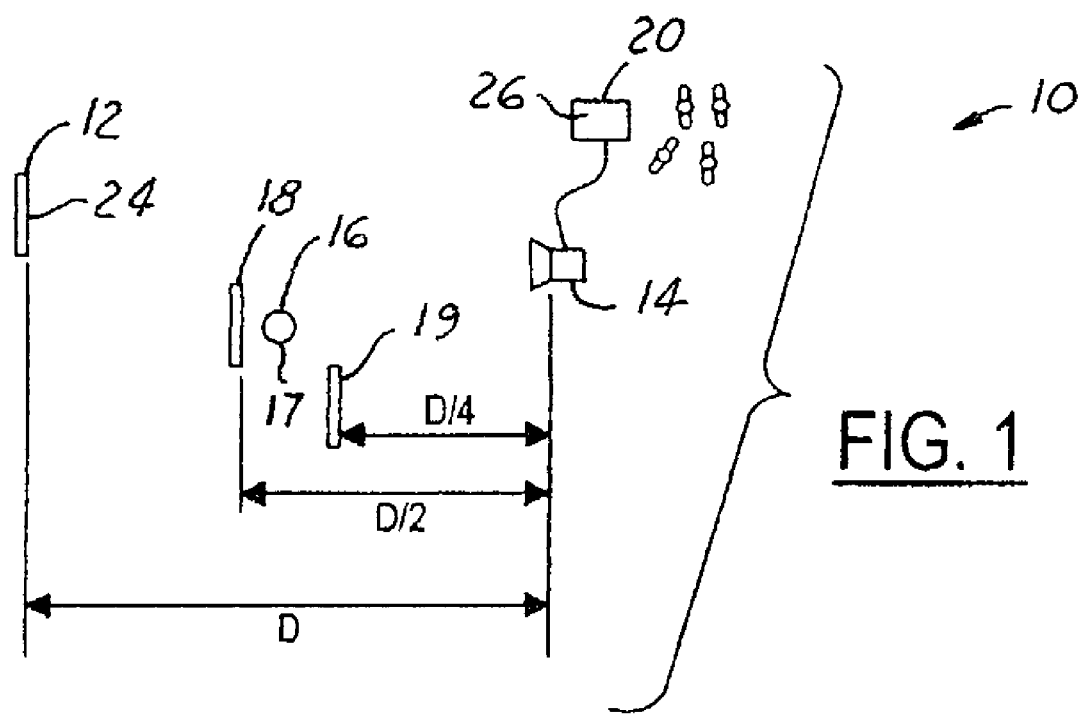
FIG. 1 is an aerial view of a method for testing cameras according to one embodiment of the present invention.
Figure 2:
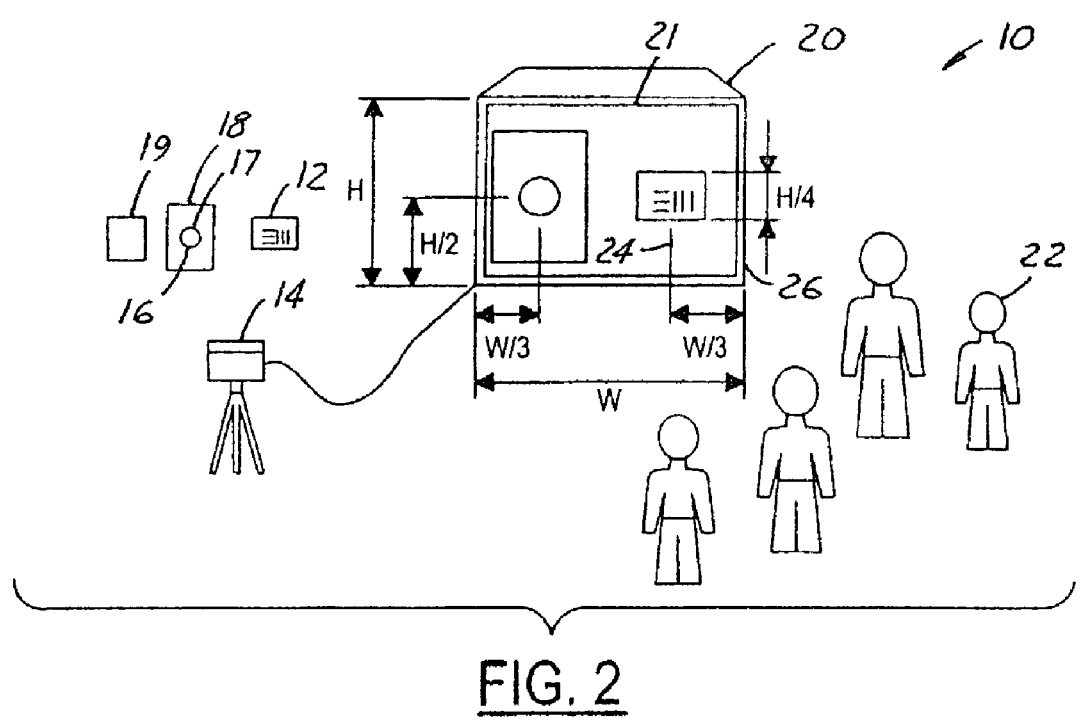
FIG. 2 is a frontal view of FIG. 1.

Referring to FIGS. 1 and 2, a camera testing system 10, including a first target 12, in accordance with one embodiment of the present invention, is illustrated. A first camera 14 is aligned a remote distance from the first target 12. The first camera 14 receives a first light signal generated from a first light source 16, here embodied as a light bulb 17 and a reflective surface 18. A first dimming component 19 is engaged to initiate a first dimming condition of the first light source 16 from the first camera 14 thereby generating a first lighting condition signal. The monitor 20 displays an image 21 of the lighting condition signal, which is viewed by at least one observer 22, or as illustrated, a group of observers.

The size of the first target 12, e.g. USAF Tribar, is such that it is substantially resolvable in normal lighting. Alternate embodiments of the present invention include a second target or a plurality of targets, as will be understood by one skilled in the The first camera 14 is aligned a remote distance from the first target 12 and is focused thereon. The first camera 14 receives a first light signal generated from a first light source 16.

The first light source 16 is embodied as a standard 60-watt light bulb 17 placed in front of a reflective surface 18, for example a white sheet of paper, half the distance between the first target 12 and the first camera 14. Alternate embodiments of the first light source 16 include spotlights or other light sources known in the art.

The first dimming component 19 is engaged to initiate a first dimming condition of the first light source 16 from the first camera 14, thereby generating a first lighting condition signal. The first dimming component 19 also initiates a second dimming condition of the first light source 16 from the first camera 14, thereby generating a second lighting condition signal. For alternate embodiments, the dimming component 19 varies the light intensity to generate a set of dimming conditions.

The first dimming component 19 is further adapted to initiate a dimming condition of the aforementioned second light source. Further dimming conditions are initiated depending on the desired number of statistical data points.

The embodied first dimming component 19 includes a moveable glare shield and a dimming mechanism to dim the light sources. Typical dimming mechanisms include manually operated dimming switches, control circuits, or any other device designed to incrementally reduce light from the first light source 16.

The monitor 20 receives an image of the first target 12 from the first camera 14. The remote distance between the first camera 14 and the first target 12 is tailored such that an image displays on the monitor 20 substantially within at least one default image parameter. The monitor 20 further displays the first lighting condition signal and the second lighting condition signal. The remote distance between the first camera 12 and the first target 12 is further adapted such that the image displays on the monitor 20 within a set of default image parameters.

The remote distance between the first camera 14 and the first target 12 is tailored such that the image displays on the monitor 20 substantially within at least one default image parameter. Alternate embodiments include a set of default image parameters for increased calibration accuracy, as will be understood by one skilled in the art.

One embodiment of the aforementioned set of default parameters includes the distance D from the first camera 14 to the first target 12 determined through observing the image 21 on the monitor 20 and adjusting the distance D until the first target 12 appears ¼ the height of the monitor 20 and the center 24 of the first target 12 appears ⅓ of the monitor width from the right hand edge 26 of the monitor 20. The aforementioned default parameters frame a similar viewable scene for the first camera 14 and successive cameras regardless of the camera field of view, as will be understood by one skilled in the art.

The observer 22, or a group of observers, views and analyzes the image 21 of the first target 12 from the first camera 14.

Camera performance under varying light conditions is assessed by progressively dimming off the image of the first light source 16, as viewed by the first camera 14 and recording the response from, for example, four observers as to how detectable the first target 12 appears on the monitor 20. The observers categorize the visibility of the first target 12 in terms of detectability levels.

An embodiment of the detectability levels includes: 0. Nothing is resolvable; 1. Something is resolvable; 2. Two separate groups of something are resolvable; 3. One group of three bars is clearly resolvable; 4. Both horizontal and vertical bars are clearly resolvable.

The present invention is directed to a test for checking camera performance in situations having varied light levels through substantially simulating an oncoming traffic view at night.

Figure 3:
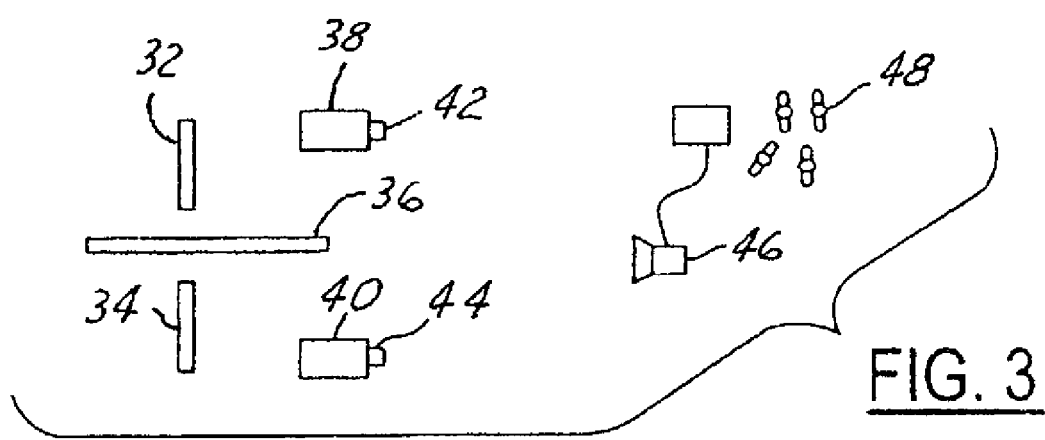
FIG. 3 is an alternate embodiment of FIG. 1 according to one embodiment of the present invention.

Referring to FIG. 3, an alternate embodiment of FIG. 1 is illustrated. The targets 32, 34 in this embodiment are illustrated in a cubby hole arrangement with a divider 36, approximately one meter in length, which facilitates the application of dramatically different light levels on the targets 32, 34. The targets 32, 24 are illuminated by 150-watt spotlights 38, 40 acting as the light source and having brightness changed through dimming mechanisms in the form of individual variable transformers 42, 44. The distance from the tested camera 46 to the targets 32, 34 is adjusted as in FIG. 1.

The tests begin with both targets 32, 34 illuminated at a level sufficient enough to allow resolution of both targets 32, 34. The light level on the first target 34 is held constant during the experiment while the light on the second target 32 is increased until the resolution degrades. The light level is measured at the targets 32, 34 with, for example, a photometer, as will be under stood by one skilled in the art. Progressive degradation as the light level at the second target 32 is increased is reported by the observers 48 and recorded using the 0 to 4 embodiment of detectability levels. The light levels at that target 32, 34 are recorded when a transition in detectability is reported by a majority of observers 48.

The present invention yields a relationship between detectability and light level as the illumination on the second target 32 is increased beyond the optimum level. Varying the incident light level in detectability increments generates detailed characterization data for tested cameras. This data is important for automotive applications because it is otherwise difficult to achieve control over scene lighting or achieve optimal conditions in a laboratory setting.

Figure 4:
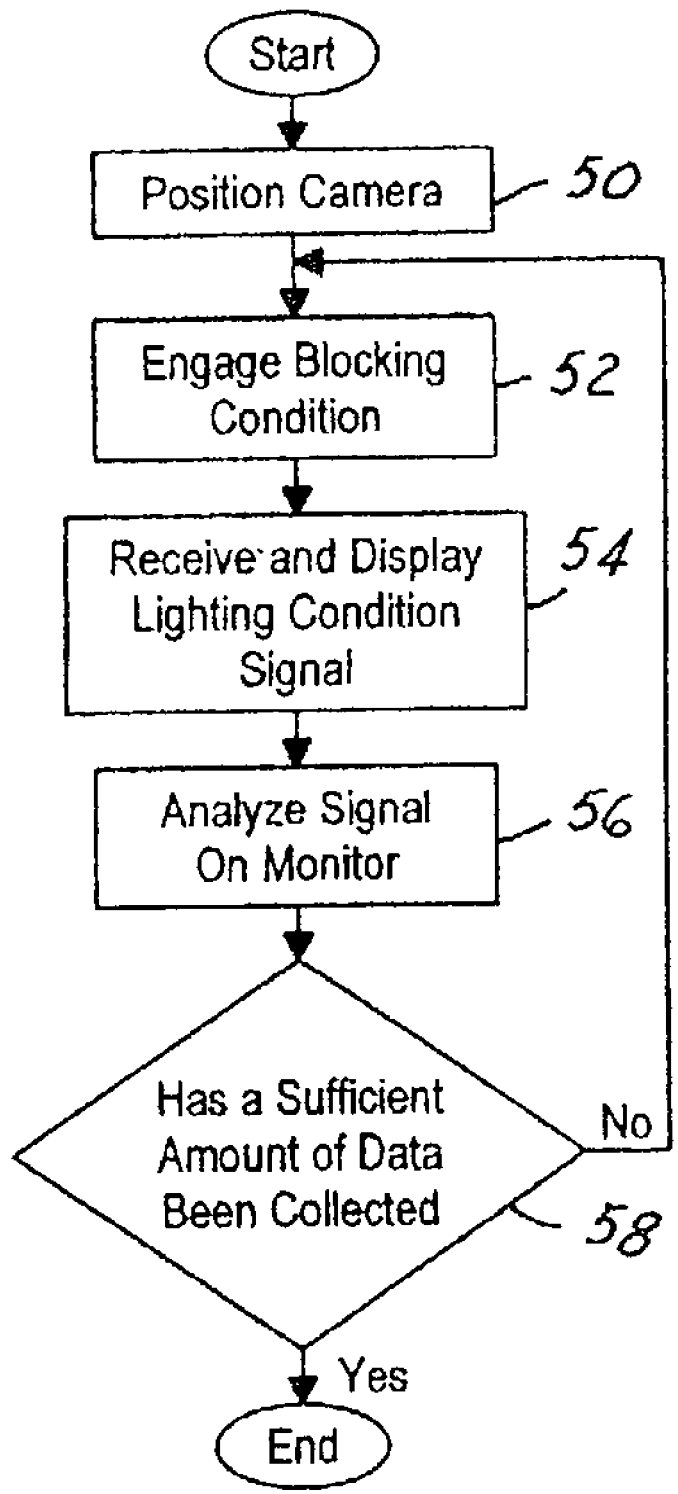
FIG. 4 is a block diagram of a method for testing cameras according to one embodiment of the present invention.

Referring to FIG. 4, a block diagram of a method for testing cameras in accordance with one embodiment of the present invention, is illustrated. The test starts in operation block 50 where the camera is positioned in view of the first target and the light source within monitor default parameters.

Operation block 52 then activates, and the blocking condition is engaged. A glare shield then progressively blocks the first camera view of the light source. The resultant lighting condition is then received by and displayed on the monitor in operation block 54.

Operation block 56 then activates, and observers are asked to assess the detectability of the target for 20%, 40%, 60%, 80% and 100% dimming of the light source. Light levels at the first camera and the first target are measured for each test with a photometer.

ANOVA, or an alternate statistical analysis, is then conducted to determine significant differences between the cameras tested, as will be understood by one skilled in the art. Because the detectability of the targets is measured on an ordinal scale, a rank transformation is performed on the original data.

A determination is then made in inquiry block 58 whether a sufficient amount of data has been collected to determine camera quality. For a negative response, operation block 52 reactivates. Otherwise, block diagram logic ends.

Important to note is that the aforementioned block diagram is run for several cameras successively, and statistical data points from the cameras are compared to determine which camera or cameras are within automotive parameters, as will be understood by one skilled in the art.

In operation, a plurality of cameras are tested such that an image of at least one target is displayed on a monitor substantially within at least one default image parameter for each consecutive camera of the plurality of cameras. Lighting conditions received by each consecutive camera of the plurality of cameras are varied, thereby generating lighting condition signals. Each consecutive camera receives the respective lighting condition signals and displays them on the monitor. A group of observers then assesses detectability of the lighting condition signals according to a set of discrete detectability levels, and the statistical variance between each consecutive camera is calculated.

An alternate embodiment of the present invention includes positioning the first camera such that an image of the first target is displayed on the monitor substantially within at least one default image parameter. Following the positioning step, the dimming mechanism is activated to vary the lighting condition receivable by the first camera, thereby generating a first set of lighting condition signals. The first set of lighting condition signals is received in the first camera and displayed on the monitor. A group of observers then assess detectability of the first set of lighting condition signals according to a set of discrete detectability levels.

The aforementioned method is subsequently engaged for further cameras. In other words, the second camera is positioned such that the image of the first target is displayed on the monitor substantially within the previously mentioned default image parameter. The lighting condition receivable by the second camera is varied, thereby generating a second set of lighting condition signals. The second set of lighting condition signals are received in the second camera and displayed on the monitor. The group of observers then assess detectability of the second set of lighting condition signals according to the set of discrete detectability levels and calculate statistical variance between the first camera and the second camera. The method presented in the current embodiment is designed for comparison of numerous numbers and types of cameras, as will be understood by one skilled in the art.

While the invention has been described in connection with one or more embodiments, it should be understood that the invention is not limited to those embodiments. On the contrary, the invention covers all alternatives, modifications, and equivalents, as may be included within the spirit and scope of the appended claims.

The invention claimed is:

1. A camera testing system comprising:
   a first target;
   a first light source adapted to generate a first light signal;
   a first camera aligned a remote distance from said first target, said first camera adapted to receive said first light signal;
   a second target substantially aligned with said first camera;
   a first dimming component adapted to engage a first dimming operation to dim said first light signal thereby generating a first lighting condition signal, said first dimming component further adapted to engage a second dimming operation to dim said first light signal thereby generating a second lighting condition signal; and
   a monitor adapted to receive said first lighting condition signal and said second lighting condition signal, said monitor further adapted to consecutively display said first lighting condition signal and said second lighting condition signal substantially within at least one default image parameter.

2. The system of claim 1 wherein said dimming component comprises a moveable glare shield.

3. The system of claim 1 wherein said dimming component comprises a dimming mechanism for said first light source.

4. The system of claim 1 further comprising a second light source adapted to generate a second light signal.

5. The system of claim 4 wherein said first dimming component is further adapted to engage a third dimming operation to dim said second light source.

6. The system of claim 1 wherein said remote distance between said first camera and said first target is further adapted such that said image displays on said monitor within a set of default image parameters.

7. The system of claim 1 wherein an observer analyzes said image of said first target from said first camera in relation to detectability parameters.

8. A method for testing cameras comprising:
   positioning a first camera such that an image of a first target is displayed on a monitor substantially within at least one default image parameter;
   varying a lighting condition receivable by said first camera, thereby generating a first set of lighting condition signals;
   receiving said first set of lighting condition signals in said first camera;
   displaying said first set of lighting condition signals on said monitor;
   assessing detectability of said first set of lighting condition signals according to a set of discrete detectability levels;
   positioning a second camera such that said image of said first target is displayed on said monitor substantially within said at least one default image parameter;
   varying said lighting condition receivable by said second camera, thereby generating a second set of lighting condition signals;
   receiving said second set of lighting condition signals in said second camera;
   displaying said second set of lighting condition signals on said monitor;
   assessing detectability of said second set of lighting condition signals according to said set of discrete detectability levels; and
   calculating statistical variance between said first camera and said second camera.

9. The method of claim 8 wherein varying said lighting condition comprises progressively blocking a first light source with a glare shield.

10. The method of claim 8 wherein varying said lighting condition comprises varying intensity of a spotlight directed toward said first target.

11. The method of claim 8 wherein varying said lighting condition comprises progressively blocking a first light source with a glare shield.

12. The method of claim 8 wherein varying said lighting condition comprises varying intensity of a spotlight directed toward said first target.

* * * * *